(12) United States Patent
Yang

(10) Patent No.: US 11,766,613 B2
(45) Date of Patent: Sep. 26, 2023

(54) METHOD AND APPARATUS FOR OBSERVING VIRTUAL ITEM IN VIRTUAL ENVIRONMENT AND READABLE STORAGE MEDIUM

(71) Applicant: Tencent Technology (Shenzhen) Company Limited, Shenzhen (CN)

(72) Inventor: Jin Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 17/326,160

(22) Filed: May 20, 2021

(65) Prior Publication Data

US 2021/0268380 A1 Sep. 2, 2021

Related U.S. Application Data

(63) Continuation of application No. PCT/CN2020/079651, filed on Mar. 17, 2020.

(30) Foreign Application Priority Data

Apr. 11, 2019 (CN) .......................... 201910290579.2

(51) Int. Cl.
*A63F 13/5258* (2014.01)
*A63F 13/5252* (2014.01)
(Continued)

(52) U.S. Cl.
CPC ...... *A63F 13/5258* (2014.09); *A63F 13/5252* (2014.09); *A63F 13/53* (2014.09); *G06F 3/011* (2013.01)

(58) Field of Classification Search
CPC .............. A63F 13/5258; A63F 13/5252; A63F 13/5255
See application file for complete search history.

(56) References Cited

U.S. PATENT DOCUMENTS 8,696,451 B2 * 4/2014 Nimura ............... A63F 13/5258
463/31
9,878,245 B2 * 1/2018 Sakurai ................. A63F 13/426
(Continued)

FOREIGN PATENT DOCUMENTS

CN 1957378 A 5/2007
CN 106569614 A 4/2017
(Continued)

OTHER PUBLICATIONS

Tencent Technology, SG Office Action, Singapore Patent Application No. 11202104919U, dated Sep. 5, 2022, 8 pgs.
(Continued)

*Primary Examiner* — James S. McClellan
(74) *Attorney, Agent, or Firm* — Morgan, Lewis & Bockius LLP

(57) ABSTRACT

This application discloses a method and apparatus for observing a virtual item in a virtual environment performed at a computer device and a non-transitory computer-readable storage medium. The method includes: displaying a first environment interface, the first environment interface including a picture of a virtual environment when performing rotation observation by using a first rotation axis distance; receiving a viewing angle rotation operation; adjusting, when an operation parameter of the viewing angle rotation operation satisfies an item observation condition, the first rotation axis distance to a second rotation axis distance by adjusting a position of a rotation center; and displaying a second environment interface, the second environment interface including a picture of the virtual environment when performing rotation observation on a virtual item in the virtual environment by using the second rotation axis distance.

20 Claims, 10 Drawing Sheets

(51) Int. Cl.
    *A63F 13/53*     (2014.01)
    *G06F 3/01*     (2006.01)

(56) References Cited

U.S. PATENT DOCUMENTS

| | | | |
|---|---|---|---|
| 2002/0072417 A1 | 6/2002 | Kudo | |
| 2007/0265081 A1 | 11/2007 | Shimura et al. | |
| 2007/0270215 A1* | 11/2007 | Miyamoto | A63F 13/335 463/32 |
| 2008/0043022 A1 | 2/2008 | Ishihara | |
| 2017/0270711 A1 | 9/2017 | Schoenberg | |
| 2019/0091569 A1 | 3/2019 | Wu et al. | |
| 2021/0268380 A1 | 9/2021 | Yang | |

FOREIGN PATENT DOCUMENTS

| | | |
|---|---|---|
| CN | 108499105 A | 9/2018 |
| CN | 108635857 A | 10/2018 |
| CN | 108717733 A | 10/2018 |
| CN | 108815851 A | 11/2018 |
| CN | 110045 827 A | 7/2019 |
| EP | 0583060 A2 | 2/1994 |
| JP | 2001149643 A | 6/2001 |
| JP | 2001178963 A | 7/2001 |
| JP | 2011215946 A | 10/2011 |
| JP | 2014235596 A | 12/2014 |
| JP | 2015026172 A | 2/2015 |
| JP | 2019008346 A | 1/2019 |
| RU | 2670351 | 10/2018 |
| WO | WO 2018051592 A1 | 3/2018 |

OTHER PUBLICATIONS

Tencent Technology, WO, PCT/CN2020/079651, dated Jun. 22, 2020, 5 pgs.
Tencent Technology, IPRP, PCT/CN2020/079651, dated Sep. 28, 2021, 6 pgs.
Tencent Technology, AU Office Action, Australian Patent Application No. 2020256776, dated Aug. 23, 2022, 3 pgs.
Tencent Technology, RU Office Action and Search Report, Russian Federation Application No. 2021127032, dated Aug. 26, 2022, 15 pgs.
Tencent Technology, Russian Office Action, RU Patent Application No. 2021127032, dated Dec. 27, 2022, 12 pgs.
Tencent Technology, ISR, PCT/CN2020/079651, dated Jun. 22, 2020, 2 pgs.
Tencent Technology, CA Office Action, Canadian Patent Application No. 3,133,001, dated Dec. 5, 2022, 6 pgs.
Extended European Search Report, EP20787691.3, dated May 11, 2022, 8 pgs.

* cited by examiner

METHOD AND APPARATUS FOR OBSERVING VIRTUAL ITEM IN VIRTUAL ENVIRONMENT AND READABLE STORAGE MEDIUM

CROSS-REFERENCE TO RELATED APPLICATIONS

This application is a continuation application of PCT Patent Application No. PCT/CN2020/079651, entitled "METHOD AND APPARATUS FOR OBSERVING VIRTUAL ITEM IN VIRTUAL ENVIRONMENT AND READABLE STORAGE MEDIUM" filed on Mar. 17, 2020, which claims priority to Chinese Patent Application No. 201910290579.2, filed with the China National Intellectual Property Administration on Apr. 11, 2019, and entitled "METHOD AND APPARATUS FOR OBSERVING VIRTUAL ITEM IN VIRTUAL ENVIRONMENT AND READABLE STORAGE MEDIUM", all of which are incorporated herein by reference in their entirety.

FIELD OF THE TECHNOLOGY

Embodiments of this application relate to the field of computer technologies, and in particular, to a method and apparatus for observing a virtual item in a virtual environment and a readable storage medium.

BACKGROUND OF THE DISCLOSURE

In an application including a virtual environment, a virtual object in the virtual environment usually needs to be controlled to move in the virtual environment, for example, walk, drive, swim, fight, or pick up an item. Picking up an item means controlling the virtual object to perform a picking-up operation on a virtual item in the virtual environment.

In the related art, in order to pick up a virtual item, a virtual object needs to look downward to determine the position of the virtual item first, then move to a position near the virtual item according to the position of the virtual item, and select the virtual item to implement a picking-up operation on the virtual item.

However, such a process usually has a problem of inaccurate viewing angle rotation.

SUMMARY

According to various embodiments provided in this application, a method and apparatus for observing a virtual item in a virtual environment and a readable storage medium are provided.

In one aspect, a method for observing a virtual item in a virtual environment is provided, performed by a computer device, the method including:

displaying a first environment interface, the first environment interface comprising a picture of a virtual environment when performing rotation observation by using a first rotation axis distance, the first rotation axis distance being a distance between an observation point of a virtual object and a rotation center;

receiving a viewing angle rotation operation, the viewing angle rotation operation being configured for rotating the observation point about the rotation center;

adjusting, when an operation parameter of the viewing angle rotation operation satisfies an item observation condition, the first rotation axis distance to a second rotation axis distance by adjusting a position of the rotation center; and displaying a second environment interface, the second environment interface comprising a picture of the virtual environment when performing rotation observation on a virtual item in the virtual environment by using the second rotation axis distance.

In another aspect, an apparatus for observing a virtual item in a virtual environment is provided, including:

a display module, configured to display a first environment interface, the first environment interface comprising a picture of a virtual environment when performing rotation observation by using a first rotation axis distance, the first rotation axis distance being a distance between an observation point of a virtual object and a rotation center;

a receiving module, configured to receive a viewing angle rotation operation, the viewing angle rotation operation being configured for rotating the observation point about the rotation center;

an adjustment module, configured to adjust, when an operation parameter of the viewing angle rotation operation satisfies an item observation condition, the first rotation axis distance to a second rotation axis distance by adjusting a position of the rotation center; and the display module being further configured to display a second environment interface, the second environment interface comprising a picture of the virtual environment when performing rotation observation on a virtual item in the virtual environment by using the second rotation axis distance.

In another aspect, a computer device is provided, including a memory and a processor, the memory storing computer-readable instructions, the computer-readable instructions, when executed by the processor, causing the processor to perform the method for observing a virtual item in a virtual environment according to the embodiments of this application.

In another aspect, one or more non-transitory computer-readable storage media storing computer-readable instructions are provided, the computer-readable instructions, when executed by one or more processors, causing the one or more processors to perform the method for observing a virtual item in a virtual environment according to the embodiments of this application.

In another aspect, a computer program product is provided, the computer program product, when run on a computer, causing the computer to perform the method for observing a virtual item in a virtual environment according to the embodiments of this application.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
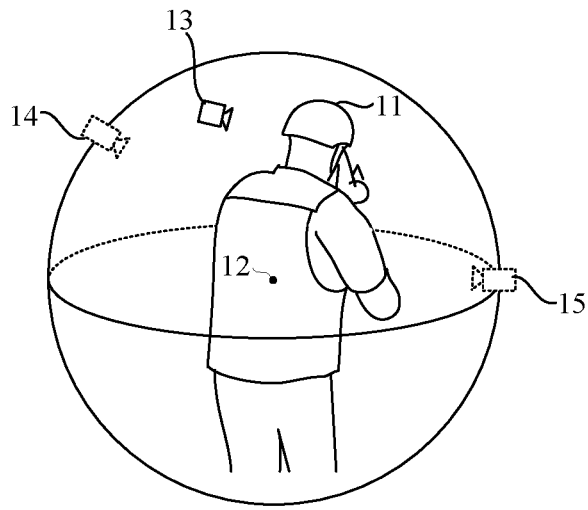
FIG. 1 is a schematic diagram of an observation manner of a camera model according to an exemplary embodiment of this application.

To make the objectives, technical solutions, and advantages of this application clearer, the following further describes implementations of this application in detail with reference to the accompanying drawings.

First, terms involved in the embodiments of this application are briefly introduced.

Rotation axis distance: it refers to a distance between an observation point and a rotation center when rotation observation is performed on a virtual environment. In some embodiments, during observation of the virtual environment, simulation photographing is performed on the virtual environment by using a camera model at the observation point, and a picture in the virtual environment is acquired, to implement the observation of the virtual environment. That is, the rotation axis distance refers to a distance between the camera model and a rotation center of the camera model. In some embodiments, during changing of the rotation axis distance, a relative position of the camera model and a virtual object remains unchanged, and a position of the rotation center is adjusted, to change the rotation axis distance. The changing of the rotation axis distance is mainly used for adjusting rotation flexibility of the camera model. For example, when a rotation axis distance is relatively small, the rotation flexibility is relatively high, so that when the same slide operation is performed on a screen, an angle at which the camera model rotates is relatively large, and a range of observing the virtual environment is relatively wide.

Camera model: it is a three-dimensional model located around a virtual object in a virtual environment. When the virtual environment is observed by using a first-person viewing angle, the camera model is located near the head of the virtual object or at the head of the virtual object. When the virtual environment is observed by using a third-person viewing angle, the camera model may be located behind the virtual object and bound to the virtual object, or may be located at any position away from the virtual object by a preset distance. The virtual object located in the three-dimensional virtual environment may be observed from different angles by using the camera model. In some embodiments, when the third-person viewing angle is a first-person over-shoulder viewing angle, the camera model is located behind the virtual object (for example, the head and the shoulders of the virtual character). In some embodiments, the camera model is not actually displayed in the three-dimensional virtual environment, that is, the camera model cannot be recognized in the three-dimensional virtual environment displayed in the user interface.

Description is made by using an example in which the camera model is located at any position away from the virtual object by a preset distance. In some embodiments, one virtual object corresponds to one camera model, and the camera model may rotate with the virtual object as a rotation center. For example, the camera model is rotated with any point of the virtual object as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual object may be the head or the torso of the virtual object, or any point around the virtual object. This is not limited in the embodiments of this application. In some embodiments, when the camera model observes the virtual object, a viewing angle direction of the camera model is a direction in which a vertical line on a tangent plane of a spherical surface on which the camera model is located points to the virtual object.

In some embodiments, the camera model may alternatively observe the virtual object at a preset angle in different directions of the virtual object.

For example, referring to FIG. 1, a point in a virtual object 11 is determined as a rotation center 12, and the camera model rotates about the rotation center 12. In some embodiments, the camera model is configured with an initial position, and the initial position is a position above and behind the virtual object (for example, a position behind the brain). For example, as shown in FIG. 1, the initial position is a position 13, and when the camera model rotates to a position 14 or a position 15, a viewing angle direction of the camera model changes as the camera model rotates.

Figure 2:
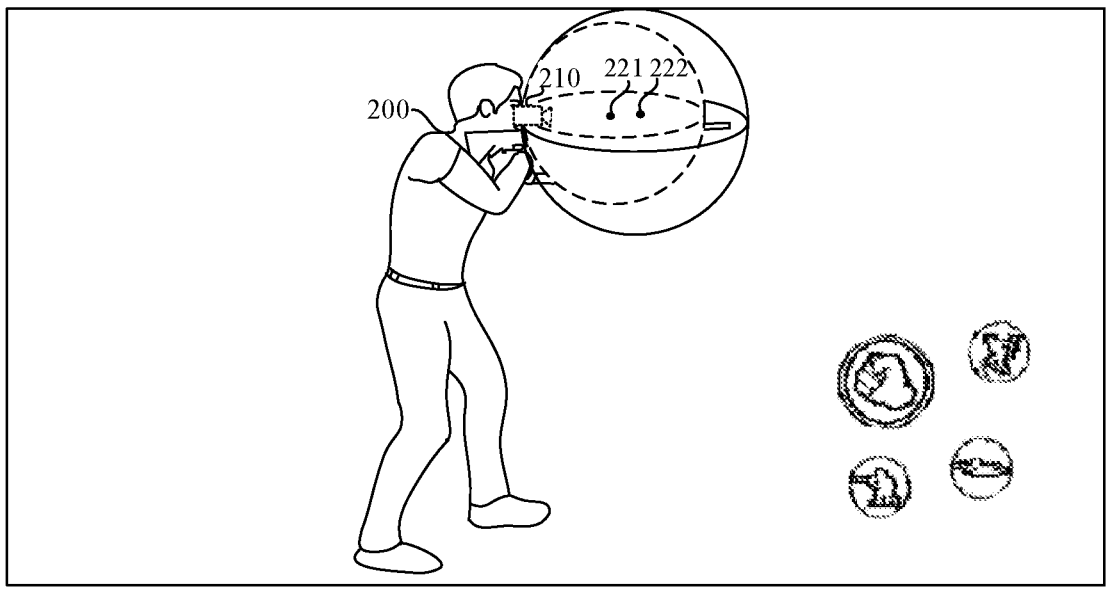
FIG. 2 is a schematic diagram of a correspondence between a rotation axis distance and a rotation range according to an exemplary embodiment of this application.

With reference to FIG. 1, the adjustment of a rotation axis distance is described. As shown in FIG. 2, a position where the nose of the virtual object 200 is located is a position where a camera model 210 is located (by using a first-person viewing angle as an example), and a rotation center 221 is located at a position shown in FIG. 2. The camera model 210 rotates about the rotation center 221, so that a first rotation axis distance of the camera model 210 before the axis distance adjustment is a distance between the camera model 210 and the rotation center 221, and a rotation range of the camera model 210 before the axis distance adjustment is shown as a dashed line spherical range in FIG. 2. After the position of the rotation center 221 is adjusted to a position of a rotation center 222, a second rotation axis distance is a distance between the camera model 210 and the rotation center 222, and a rotation range of the camera model 210 after the axis distance adjustment is shown as a solid line spherical range in FIG. 2.

A terminal in this application may be a desktop computer, a portable laptop computer, a mobile phone, a tablet computer, an eBook reader, a Moving Picture Experts Group Audio Layer III (MP3) player, a Moving Picture Experts Group Audio Layer IV (MP4) player, or the like. An application supporting a virtual environment is installed and run on the terminal, such as an application supporting a three-dimensional virtual environment. The application may be any one of a virtual reality application, a three-dimensional map application, a military simulation application, a third-personal shooting game (TPS) game, a first-person shooting game (FPS) game, and a MOBA game. In some embodiments, the application may be a standalone application, such as a standalone 3D game application, or may be a network online application.

Figure 3:
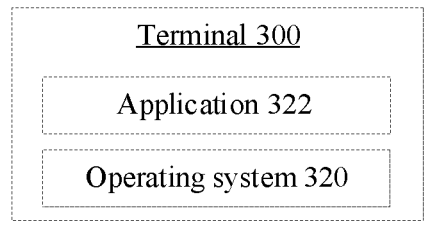
FIG. 3 is a structural block diagram of a terminal according to an exemplary embodiment of this application.

FIG. 3 shows a structural block diagram of an electronic device according to an exemplary embodiment of this application. The electronic device 300 includes an operating system 320 and an application 322.

The operating system 320 is basic software provided for the application 322 to perform secure access to computer hardware.

The application 322 is an application supporting a virtual environment. In some embodiments, the application 322 is an application supporting a three-dimensional virtual environment. The application 322 may be any one of a virtual reality application, a three-dimensional application, a military simulation application, a TPS game, an FPS game, a MOBA game, and a multiplayer shooting survival game. The application 322 may be a standalone application, such as a standalone 3D game.

Figure 4:
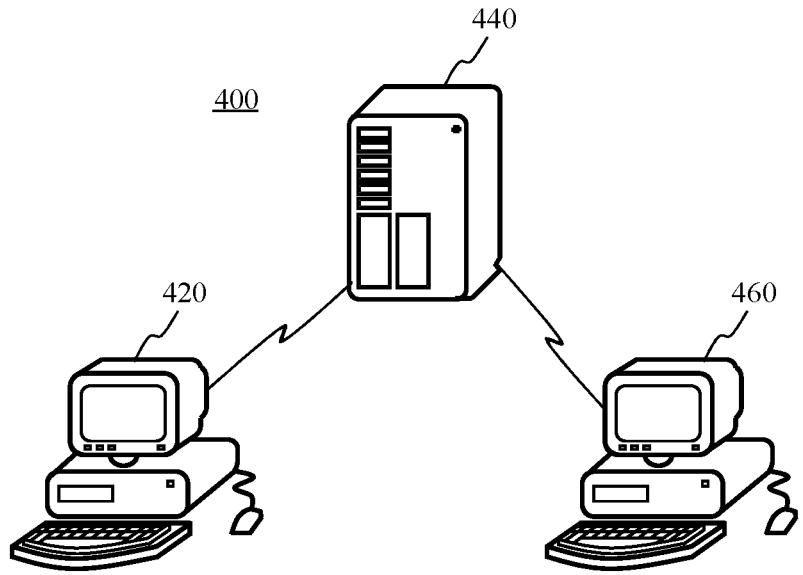
FIG. 4 is a schematic diagram of an implementation environment according to an exemplary embodiment of this application.

FIG. 4 shows a structural block diagram of a computer system according to an exemplary embodiment of this application. The computer system 400 includes a first device 420, a server 440, and a second device 460.

An application supporting a virtual environment is installed and run on the first device 420. The application may be any one of a virtual reality application, a three-dimensional map application, a military simulation application, a TPS game, an FPS game, a MOBA game, and a multiplayer shooting survival game. The first device 420 is a device used by a first user, the first user uses the first device 420 to control a first virtual object in the virtual environment to move, and the movement includes, but is not limited to, at least one of body posture adjustment, crawling, walking, running, cycling, jumping, driving, picking, shooting, attacking, and throwing. For example, the first virtual object is a first virtual character, such as a simulated character role or a cartoon character role.

The first device 420 is connected to the server 440 by using a wireless network or a wired network.

The server 440 includes at least one of one server, a plurality of servers, a cloud computing platform, and a virtualization center. The server 440 is configured to provide a backend service for an application supporting a three-dimensional virtual environment. In some embodiments, the server 440 is responsible for primary computing work, and the first device 420 and the second device 460 are responsible for secondary computing work. Alternatively, the server 440 is responsible for secondary computing work, and the first device 420 and the second device 460 are responsible for primary computing work; Alternatively, the server 440, the first device 420, and the second device 460 perform collaborative computing by using a distributed computing architecture among each other.

An application supporting a virtual environment is installed and run on the second device 460. The application may be any one of a virtual reality application, a three-dimensional map application, a military simulation application, an FPS game, a MOBA game, and a multiplayer shooting survival game. The second device 460 is a device used by a second user, the second user uses the second device 460 to control a second virtual object in the virtual environment to move, and the movement includes, but is not limited to, at least one of body posture adjustment, crawling, walking, running, cycling, jumping, driving, picking, shooting, attacking, and throwing. For example, the second virtual object is a second virtual character, such as a simulated character role or a cartoon character role.

In some embodiments, the first virtual character and the second virtual character are located in the same virtual environment. In some embodiments, the first virtual character and the second virtual character may belong to the same team or the same organization, have a friend relationship, or have a temporary communication permission. In some embodiments, the first virtual character and the second virtual character may alternatively belong to different teams, different organizations, or two groups hostile to each other.

In some embodiments, the applications mounted on the first device 420 and the second device 460 are the same, or the applications mounted on the two devices are the same type of applications of different control system platforms. The first device 420 may generally refer to one of a plurality of devices, the second device 460 may generally refer to one of a plurality of devices. In this embodiment, description is made by using only the first device 420 and the second device 460 as an example. The type of the first device 420 and the type of the second device 460 may be the same or may be different. The device type includes at least one of a game console, a desktop computer, a smartphone, a tablet computer, an eBook reader, an MP3 player, an MP4 player, and a portable laptop computer. In the following embodiments, description is made by using an example in which the device is a desktop computer.

A person skilled in the art may learn that there may be more or fewer devices. For example, there may be only one device, or there may be dozens of or hundreds of or more devices. The quantity and the device type of the device are not limited in the embodiments of this application.

Figure 5:
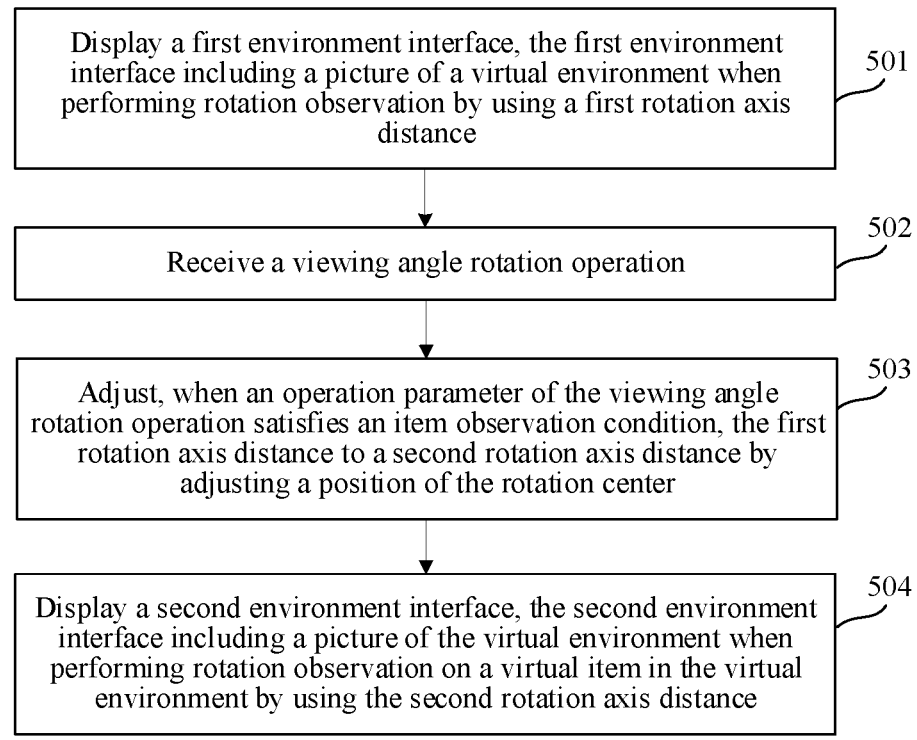
FIG. 5 is a flowchart of a method for observing a virtual item in a virtual environment according to an exemplary embodiment of this application.

With reference to the foregoing description of the terms and the implementation environment, a method for observing a virtual item in a virtual environment according to an embodiment of this application is described. For example, the method is applied to a terminal. As shown in FIG. 5, the method includes:

Step 501. Display a first environment interface, the first environment interface including a picture of a virtual environment when performing rotation observation by using a first rotation axis distance.

In some embodiments, the first rotation axis distance is a distance between an observation point of a virtual object and a rotation center. In some embodiments, the virtual environment is observed by acquiring pictures of the virtual environment by using a camera model at the observation point. That is, the first rotation axis distance is a distance between the camera model and the rotation center.

In some embodiments, in the process in which rotation observation is performed on the virtual environment by using the camera model, the virtual environment may be observed in a manner in which the camera model and the virtual object synchronously rotate, that is, positions of the camera model and the virtual object are bound, and during the rotation of the camera model, the virtual object synchronously rotates as the camera model rotates. The camera model may alternatively observe the virtual environment in a manner of individually rotating, that is, a position and a direction that the virtual object faces remain unchanged, and the camera model rotates to observe the virtual environment.

In some embodiments, the first rotation axis distance is a default axis distance when the virtual environment is observed.

In some embodiments, a motion status of the virtual object includes any one of a standing status, a running status, a walking status, a driving status, a riding status, and a swimming status. In some embodiments, axis distance lengths of first rotation axis distances corresponding to different motion statuses of the virtual object are different. The driving status and the riding status may be alternatively combined to be implemented as one status. For example, the riding status and the driving status are combined to be implemented as a driving status.

In some embodiments, a personal viewing angle for observing the virtual environment includes any one of a first-person viewing angle and a third-person viewing angle. In some embodiments, axis distance lengths of first rotation axis distances corresponding to different personal viewing angles are different.

In some embodiments, with reference to the motion statuses of the virtual object and the personal viewing angles for observing the virtual environment, for different combinations of the motion statuses and the personal viewing angles, corresponding axis distance lengths of the first rotation axis distance are different. For example, for a correspondence among the personal viewing angles, the motion statuses, and the axis distance lengths of the first rotation axis distances, refer to the following Table 1:

TABLE 1

| Motion status | Personal viewing angle | First rotation axis distance |
| --- | --- | --- |
| Standing status | First-person viewing angle | $(x_1, y_1)$ |
| | Third-person viewing angle | $(x_2, y_2)$ |
| Driving status | First-person viewing angle | $(x_3, y_3)$ |
| | Third-person viewing angle | $(x_4, y_4)$ |
| Swimming status | First-person viewing angle | $(x_5, y_5)$ |
| | Third-person viewing angle | $(x_6, y_6)$ |

$x_1$ indicates an axis distance in the horizontal direction when the virtual object is in a standing status and observes the virtual environment at a first-person viewing angle, and $y_1$ indicates an axis distance in the vertical direction when the virtual object is in the standing status and observes the virtual environment at the first-person viewing angle. $x_2$ indicates an axis distance in the horizontal direction when the virtual object is in a standing status and observes the virtual environment at a third-person viewing angle, and $y_2$ indicates an axis distance in the vertical direction when the virtual object is in the standing status and observes the virtual environment at the third-person viewing angle. $x_3$ indicates an axis distance in the horizontal direction when the virtual object is in a driving status and observes the virtual environment at a first-person viewing angle, and $y_3$ indicates an axis distance in the vertical direction when the virtual object is in the driving status and observes the virtual environment at the first-person viewing angle. $x_4$ indicates an axis distance in the horizontal direction when the virtual object is in a driving status and observes the virtual environment at a third-person viewing angle, and $y_4$ indicates an axis distance in the vertical direction when the virtual object is in the driving status and observes the virtual environment at the third-person viewing angle. $x_5$ indicates an axis distance in the horizontal direction when the virtual object is in a swimming status and observes the virtual environment at a first-person viewing angle, and $y_5$ indicates an axis distance in the vertical direction when the virtual object is in the swimming status and observes the virtual environment at the first-person viewing angle. $x_6$ indicates an axis distance in the horizontal direction when the virtual object is in a swimming status and observes the virtual environment at a third-person viewing angle, and $y_6$ indicates an axis distance in the vertical direction when the virtual object is in the swimming status and observes the virtual environment at the third-person viewing angle.

Step 502. Receive a viewing angle rotation operation.

In some embodiments, the viewing angle rotation operation is configured for rotating the observation point about the rotation center.

In some embodiments, an implementation of the viewing angle rotation operation includes at least one of the following manners:

First, the method is applied to a mobile terminal including a touch display screen, and the viewing angle rotation operation is implemented by performing sliding on the touch display screen.

In some embodiments, a slide operation on the touch display screen may be a slide operation performed on the left half of the touch display screen, or may be a slide operation performed on the right half of the touch display screen, and may alternatively be a slide operation performed at any position of the touch display screen. A specific position of the slide operation is determined according to a setting parameter for controlling rotation of the visual angle.

Second, the method is applied to a mobile terminal including a gyroscope, and the viewing angle rotation operation is implemented by swinging the terminal to control rotation of the gyroscope.

Third, the method is applied to a desktop computer, a portable laptop computer, and the viewing angle rotation operation is implemented by performing an input operation by using an external input device, for example, a direction control signal is inputted by using a keyboard, to implement the viewing angle rotation operation.

Step 503. Adjust, when an operation parameter of the viewing angle rotation operation satisfies an item observation condition, the first rotation axis distance to a second rotation axis distance by adjusting a position of the rotation center.

In some embodiments, the item observation condition is used for indicating a condition corresponding to observation of a virtual item in the virtual environment.

In some embodiments, the operation parameter includes an operation angle, and when the operation angle falls within a target angle range, the first rotation axis distance is adjusted to the second rotation axis distance by adjusting the position of the rotation center.

In some embodiments, the operation parameter further includes an operation distance, and when the operation angle falls within the target angle range and the operation distance reaches a target distance, the first rotation axis distance is adjusted to the second rotation axis distance by adjusting the position of the rotation center.

Figure 6:
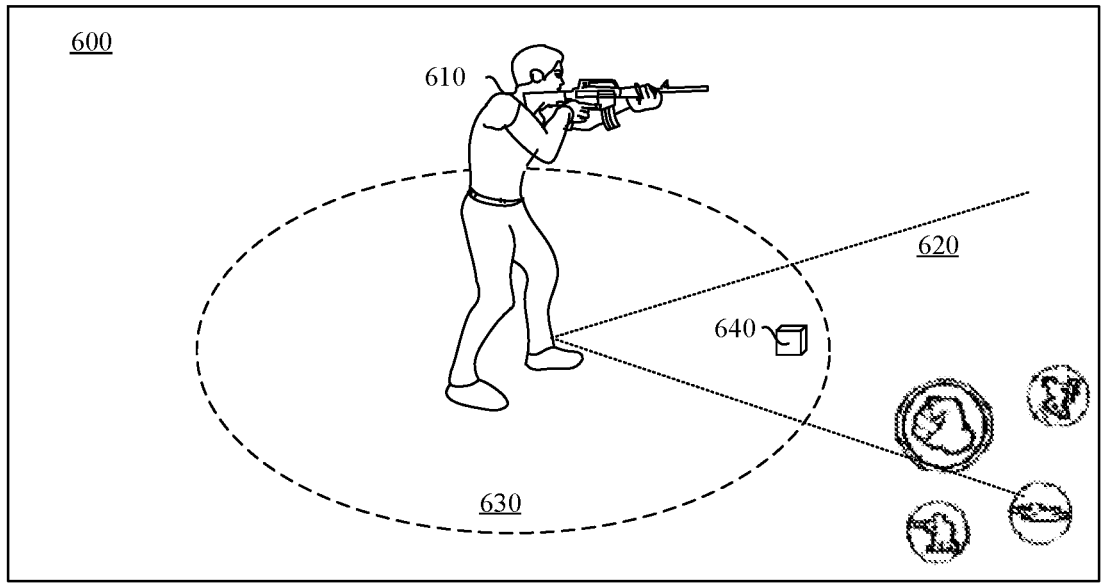
FIG. 6 is a schematic interface diagram of an item observation condition according to the embodiment shown in FIG. 5.

In some embodiments, the operation parameter further includes a virtual item existence status in a preset distance range of the virtual object in the virtual environment, and when the operation angle falls within the target angle range and a virtual item exists in the preset distance range of the virtual object in the virtual environment, the first rotation axis distance is adjusted to the second rotation axis distance by adjusting the position of the rotation center. In some embodiments, the virtual item is located in a preset distance range in a direction that the virtual object faces. That is, when the operation angle falls within the target angle range and a virtual item exists in the preset distance range of the virtual object and in a direction range that the virtual object faces, the first rotation axis distance is adjusted to the second rotation axis distance by adjusting the position of the rotation center. The virtual item is a virtual item that is to be picked up. For example, referring to FIG. 6, a first environment interface 600 includes a virtual object 610. When the terminal receives a viewing angle rotation operation, and an operation angle of the viewing angle rotation operation falls within a target angle range, whether a virtual item exists in a preset distance range 630 of the virtual object 610 and in a direction range 620 that the virtual object 610 faces is determined. As shown in FIG. 6, a virtual item 640 exists in an intersection set of the direction range 620 and the preset distance range 630, and the virtual item 640 is an item to be picked up, so that the position of the rotation center is adjusted according to the viewing angle rotation operation.

Figure 7:
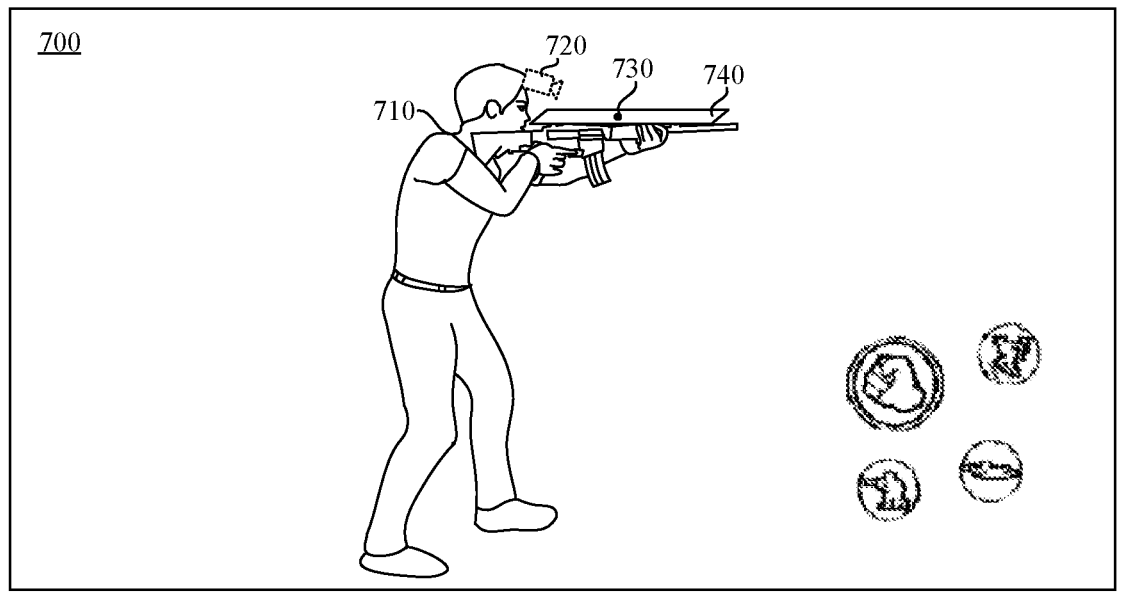
FIG. 7 is a schematic interface diagram of another item observation condition according to the embodiment shown in FIG. 5.

In some embodiments, when the virtual environment is observed by using a camera model at the observation point, the operation parameter further includes a rotation ending position of the camera model. In a case that the operation angle falls within the target angle range and the rotation ending position falls within a preset position range, the first rotation axis distance is adjusted to the second rotation axis distance by adjusting the position of the rotation center. In some embodiments, the preset position range is a range above a horizontal position corresponding to the rotation center. When observation is performed in the range above the horizontal position, it indicates that the camera model is in a status of looking downward, that is, it indicates that the camera model is in a status of observing the virtual item. Therefore, when the operation angle falls within the target angle range and the rotation ending position falls within the range above the horizontal position corresponding to the rotation center, the first rotation axis distance is adjusted to the second rotation axis distance by adjusting the position of the rotation center. For example, referring to FIG. 7, a first environment interface 700 includes a virtual object 710. When the terminal receives a viewing angle rotation operation, and an operation angle of the viewing angle rotation operation falls within a target angle range, a rotation ending position of a camera model 720 is determine. As shown in FIG. 7, a horizontal position corresponding to a rotation center 730 of the camera model 720 is a plane 740, and the rotation ending position of the camera model 720 is located above the plane 740, so that the position of the rotation center is adjusted according to the viewing angle rotation operation.

Step 504. Display a second environment interface, the second environment interface including a picture of the virtual environment when performing rotation observation on a virtual item in the virtual environment by using the second rotation axis distance.

In some embodiments, the second rotation axis distance is a distance between the observation point and an adjusted rotation center. In some embodiments, the second rotation axis distance is a distance between the camera model and the adjusted rotation center.

In conclusion, in the method for observing a virtual item in a virtual environment provided in this embodiment, the operation parameter of the viewing angle rotation operation is matched against the item observation condition, to determine whether an observation viewing angle after the viewing angle rotation operation is a viewing angle for observing the virtual item. When the observation viewing angle after the viewing angle rotation operation is the viewing angle for observing the virtual item, a rotation axis distance between the observation point and the rotation center is adjusted by adjusting the position of the rotation center, so as to adjust rotation flexibility of the observation point. Rotation flexibility matching observation of the virtual item is switched in real time by monitoring the viewing angle rotation operation, to distinguish an ordinary axis distance and an axis distance for observing the virtual item, so as to observe the virtual item by using a wider field of view in a more flexible manner.

In the method provided in this embodiment, whether the viewing angle rotation operation satisfies the item observation condition is determined by using the operation angle of the viewing angle rotation operation. Satisfying the item observation condition includes at least of the following: the operation angle falls within the target angle range, the operation distance reaches the target distance, the rotation ending position falls within the preset position range, and a virtual item exists in the preset distance range of the virtual object in the virtual environment, avoiding a problem that adjustment of the rotation axis distance is triggered by mistake because when a user performs a viewing angle rotation operation in the horizontal direction or in an inclination direction, an operation displacement also exists in the vertical direction.

In the method provided in this embodiment, whether a virtual item to be picked up exists in the preset distance range of the virtual object in the virtual environment is determined, and adjustment of the rotation axis distance is triggered when a virtual item exists in the preset distance range of the virtual object, avoiding a problem of false triggering of the rotation axis distance for observing the virtual item because adjustment is triggered when there is no virtual item around the virtual object.

Figure 8:
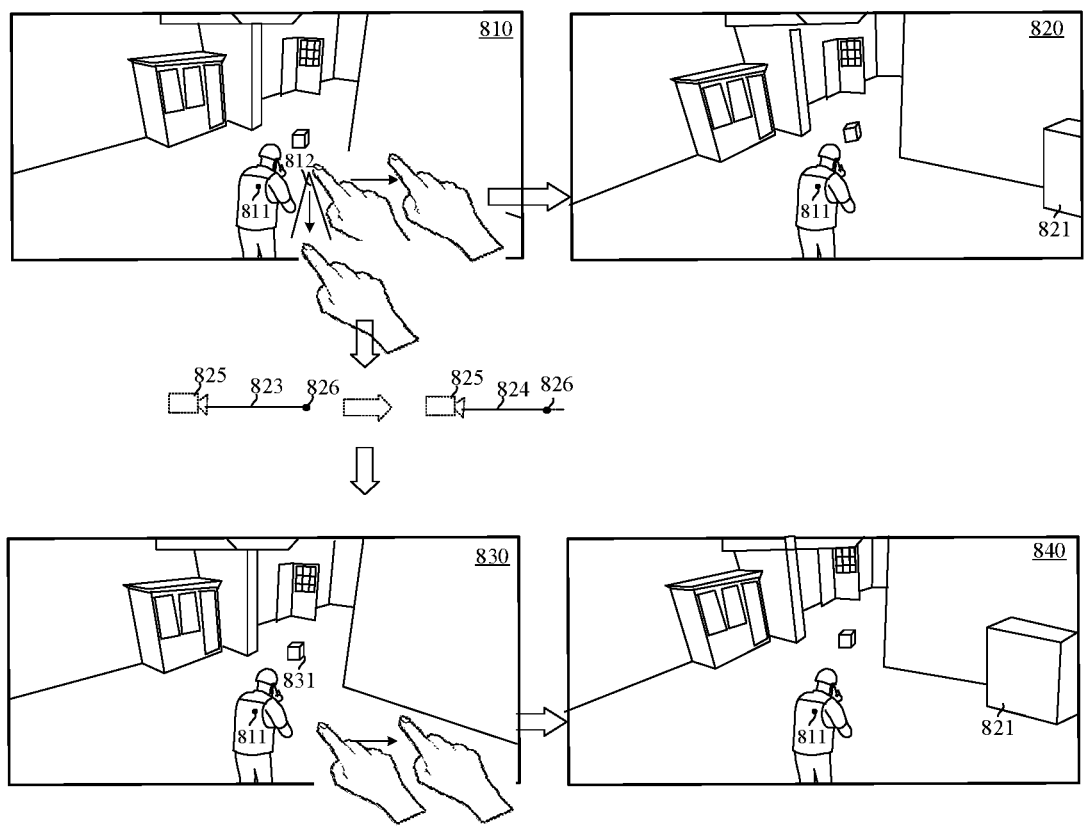
FIG. 8 is a schematic interface diagram of a method for observing a virtual item in a virtual environment according to an exemplary embodiment of this application.

For example, FIG. 8 is a schematic interface diagram of a method for observing a virtual item in a virtual environment according to an exemplary embodiment of this application. Description is made by using a third-person viewing angle as an example. As shown in FIG. 8, a first environment interface 810 includes a virtual object 811, and the virtual environment is observed by using a first rotation axis distance in the current first environment interface 810. After a finger transversely slides on a display screen of the terminal by a first distance, a first environment interface 820 is displayed, and a half of a cabinet 821 is displayed in the first environment interface 820. After a finger longitudinally slides on the display screen of the terminal, when the longitudinal slide operation satisfies an item observation condition, for example, the longitudinal slide operation falls within a target angle range 812, a position of a rotation center 822 is adjusted, to adjust a first rotation axis distance 823 (a distance between a camera model 825 and a rotation center 826) to a second rotation axis distance 824, and display a second environment interface 830. The second environment interface 830 is a picture of observing a virtual item 831 in the virtual environment by using the second rotation axis distance. After a finger transversely slides on the display screen of the terminal by a first distance, a second environment interface 840 is displayed, and the entire cabinet 821 is displayed in the second environment interface 840. It may be learned according to FIG. 8 and the foregoing description that after the first rotation axis distance is adjusted to the second rotation axis distance, by performing the same slide operation, rotation angles of the viewing angle are different, that is, rotation flexibility of the viewing angle differs. As shown in FIG. 8, after the first rotation axis distance is adjusted to the second rotation axis distance, the flexibility of the viewing angle rotation is improved, and a field of view during the viewing angle rotation is wider. That is, the first rotation axis distance is adjusted to the second rotation axis distance, to adjust the flexibility of the viewing angle rotation. In some embodiments, the first rotation axis distance is adjusted to the second rotation axis distance, so that the flexibility of the viewing angle rotation may be adjusted from low to high, or the flexibility of the viewing angle rotation may be adjusted from high to low.

Figure 9:
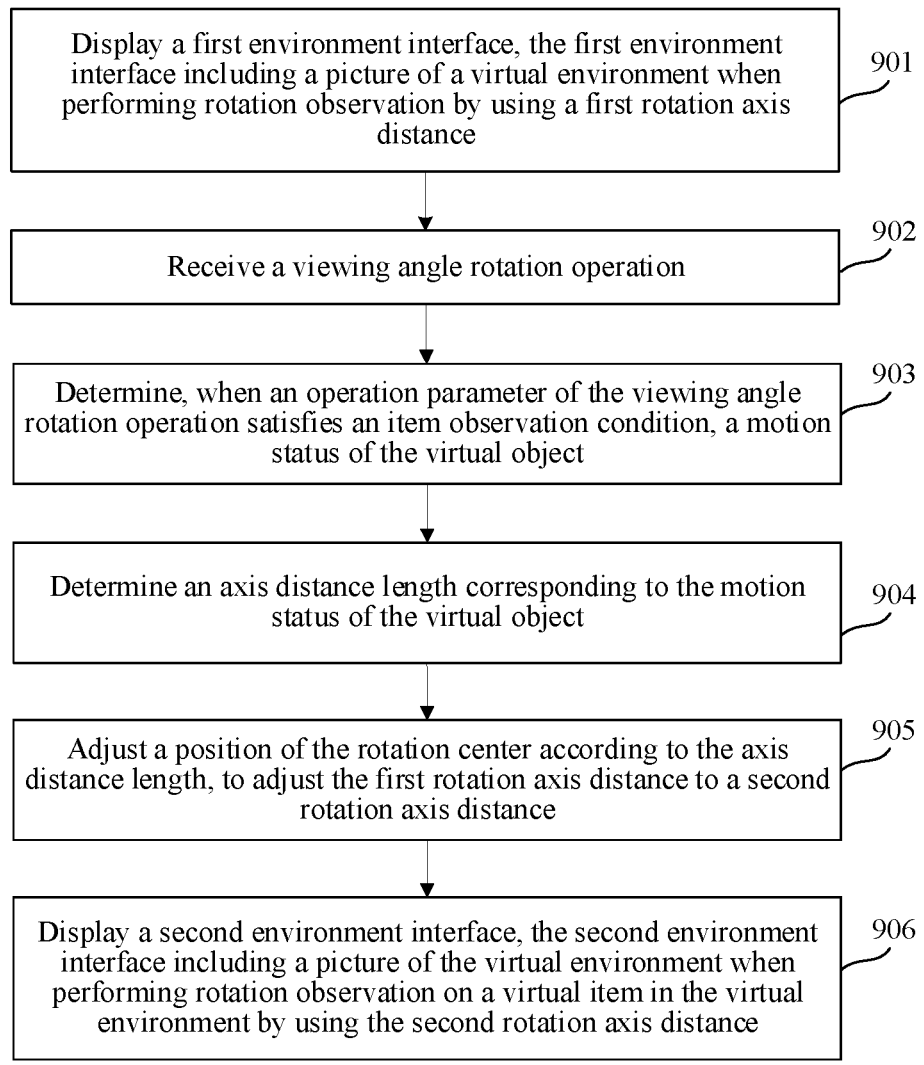
FIG. 9 is a flowchart of a method for observing a virtual item in a virtual environment according to another exemplary embodiment of this application.

In some embodiments, second rotation axis distances corresponding to different motion statuses of the virtual object are different. FIG. 9 is a flowchart of a method for observing a virtual item in a virtual environment according to another exemplary embodiment of this application. For example, the method is applied to a terminal. As shown in FIG. 9, the method includes:

Step 901. Display a first environment interface, the first environment interface including a picture of a virtual environment when performing rotation observation the virtual environment by using a first rotation axis distance.

In some embodiments, the first rotation axis distance is a distance between an observation point of a virtual object and a rotation center. In some embodiments, the virtual environment is observed by acquiring pictures of the virtual environment by using a camera model at the observation point. That is, the first rotation axis distance is a distance between the camera model and the rotation center.

In some embodiments, an observation manner in which rotation observation is performed on the virtual environment by using the first rotation axis distance is described in detail in the foregoing step 501. Details are not described again.

Step 902. Receive a viewing angle rotation operation.

In some embodiments, the viewing angle rotation operation is configured for rotating the observation point about the rotation center.

In some embodiments, an implementation of the viewing angle rotation operation is described in detail in the foregoing step 502. Details are not described again.

Step 903. Determine, when an operation parameter of the viewing angle rotation operation satisfies an item observation condition, a motion status of the virtual object.

In some embodiments, the motion status includes any one of a standing status, a running status, a walking status, a driving status, a riding status, and a swimming status.

In some embodiments, a manner of determining whether the operation parameter of the viewing angle rotation operation satisfies the item observation condition is described in detail in the foregoing step 503. Details are not described again.

Step 904. Determine an axis distance length corresponding to the motion status of the virtual object.

In some embodiments, a manner of determining the axis distance length corresponding to the motion status includes at least one of the following:

First, a correspondence between motion statuses and axis distance lengths is obtained, and a corresponding axis distance length is determined in the correspondence according to a motion status. In some embodiments, the correspondence may be stored in the terminal, or may be obtained by the terminal from a server. For example, the correspondence is shown in the following Table 2:

TABLE 2

| Motion status | Second rotation axis distance |
| --- | --- |
| Standing status | $(p_1, q_1)$ |
| Driving status | $(p_2, q_2)$ |
| Swimming status | $(p_3, q_3)$ |

$p_1$ indicates an axis distance in the horizontal direction under a standing status, and $q_1$ indicates an axis distance in the vertical direction under the standing status. $p_2$ indicates an axis distance in the horizontal direction under a driving status, and $q_2$ indicates an axis distance in the vertical direction under the driving status. $p_3$ indicates an axis distance in the horizontal direction under a swimming status, and $q_3$ indicates an axis distance in the vertical direction under the swimming status.

Second, an axis distance length corresponding to a target status is used as a reference axis distance length, an axis distance coefficient corresponding to the motion status and the target status of the virtual object is determined, and a product of the axis distance coefficient and the reference axis distance length is determined as the axis distance length corresponding to the motion status of the virtual object. In some embodiments, the motion status of the virtual object includes any one of a standing status, a driving status, and a swimming status. Description is made by using an example in which the target status is a standing status. In a case that the virtual object is in the driving status, a first axis distance coefficient corresponding to the driving status is determined, and a product of the first axis distance coefficient and the reference axis distance length is determined as an axis distance length corresponding to the driving status. Alternatively, when the virtual object is in the swimming status, a second axis distance coefficient corresponding to the swimming status is determined, and a product of the second axis distance coefficient and the reference axis distance length is determined as an axis distance length corresponding to the swimming status. In some embodiments, the terminal may store a correspondence between axis distance coefficients and motion statuses, or may obtain the correspondence from a server. For example, the correspondence is shown in the following Table 3:

TABLE 3

| Motion status | Axis distance coefficient |
| --- | --- |
| Standing status | (1, 1) |
| Driving status | (1.25, 0.8) |
| Swimming status | (1.5, 1.2) |

When a second rotation axis distance of a standing status is (x, y), a second rotation axis distance corresponding to a driving status is (0.7x, 0.8y), and a second rotation axis distance corresponding to a swimming status is (1.5x, 1.2y).

Figure 10:
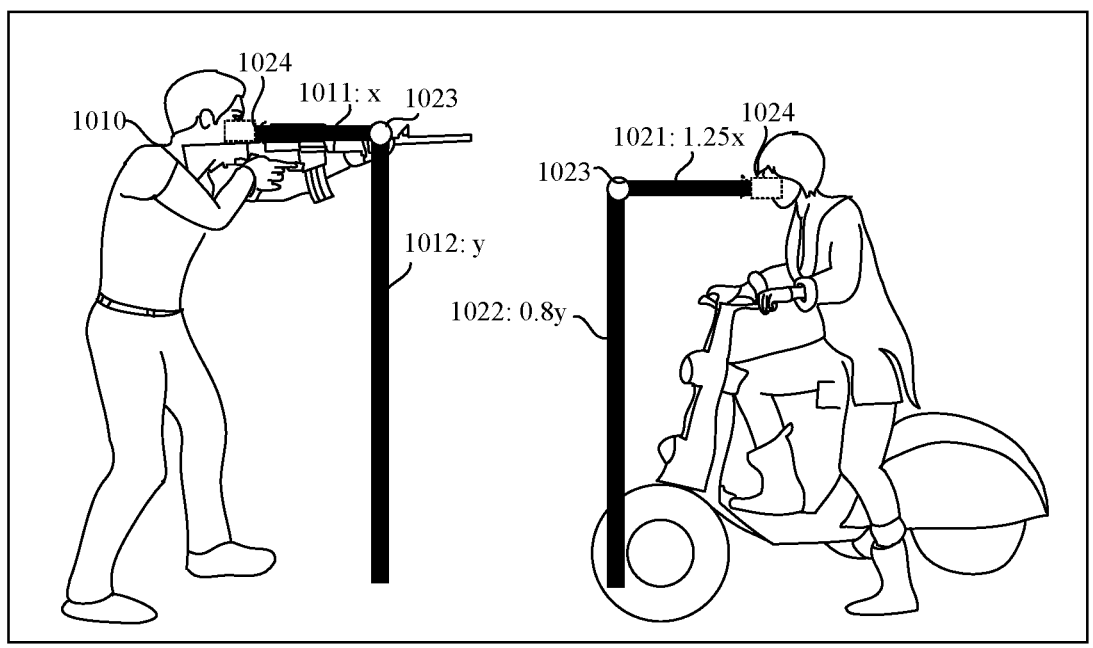
FIG. 10 is a schematic diagram of a correspondence between rotation axes corresponding to a virtual object in a standing status and in a driving status according to the embodiment shown in FIG. 9.

For example, referring to FIG. 10, when a virtual object 1010 is in a standing status, an axis distance of a transverse rotation axis 1011 corresponding to the virtual object 1010 (a distance between a rotation center 1013 and a camera model 1014) is x, and an axis distance of a longitudinal rotation axis 1012 is (a distance between the rotation center 1013 and the ground) y. When the virtual object 1010 is in a driving status, an axis distance of a transverse rotation axis 1021 corresponding to the driving status (a distance between a rotation center 1023 and a camera model 1024) is 1.25x, and an axis distance of a longitudinal rotation axis 1022 (a distance between the rotation center 1023 and the ground) is 0.8y.

Step 905. Adjust a position of the rotation center according to the axis distance length, to adjust the first rotation axis distance to a second rotation axis distance.

In some embodiments, the second rotation axis distance is a distance between the observation point and an adjusted rotation center. In some embodiments, the second rotation axis distance is a distance between the camera model and the adjusted rotation center.

Step 906. Display a second environment interface, the second environment interface including a picture of a virtual item in the virtual environment when performing rotation observation on the virtual item by using the second rotation axis distance.

In conclusion, in the method for observing a virtual item in a virtual environment provided in this embodiment, the operation parameter of the viewing angle rotation operation is matched against the item observation condition, to determine whether an observation viewing angle after the viewing angle rotation operation is a viewing angle for observing the virtual item. When the observation viewing angle after the viewing angle rotation operation is the viewing angle for observing the virtual item, a rotation axis distance between the observation point and the rotation center is adjusted by adjusting the position of the rotation center, so as to adjust rotation flexibility of the observation point. Rotation flexibility matching observation of the virtual item is switched in real time by monitoring the viewing angle rotation operation, to distinguish an ordinary axis distance and an axis distance for observing the virtual item, so as to observe the virtual item by using a wider field of view in a more flexible manner.

In the method provided in this embodiment, different second rotation axis distances are set for different motion statuses of the virtual object. Different motion statuses fit different second rotation axis distances. For example, in a driving status, a motion speed of the virtual object is relatively large, and relatively low rotation flexibility of the viewing angle is needed, so that a corresponding second rotation axis distance is fitted according to the flexibility requirement of the driving status, avoiding a problem that a second rotation axis distance in a standing status does not fit the driving status.

Figure 11:
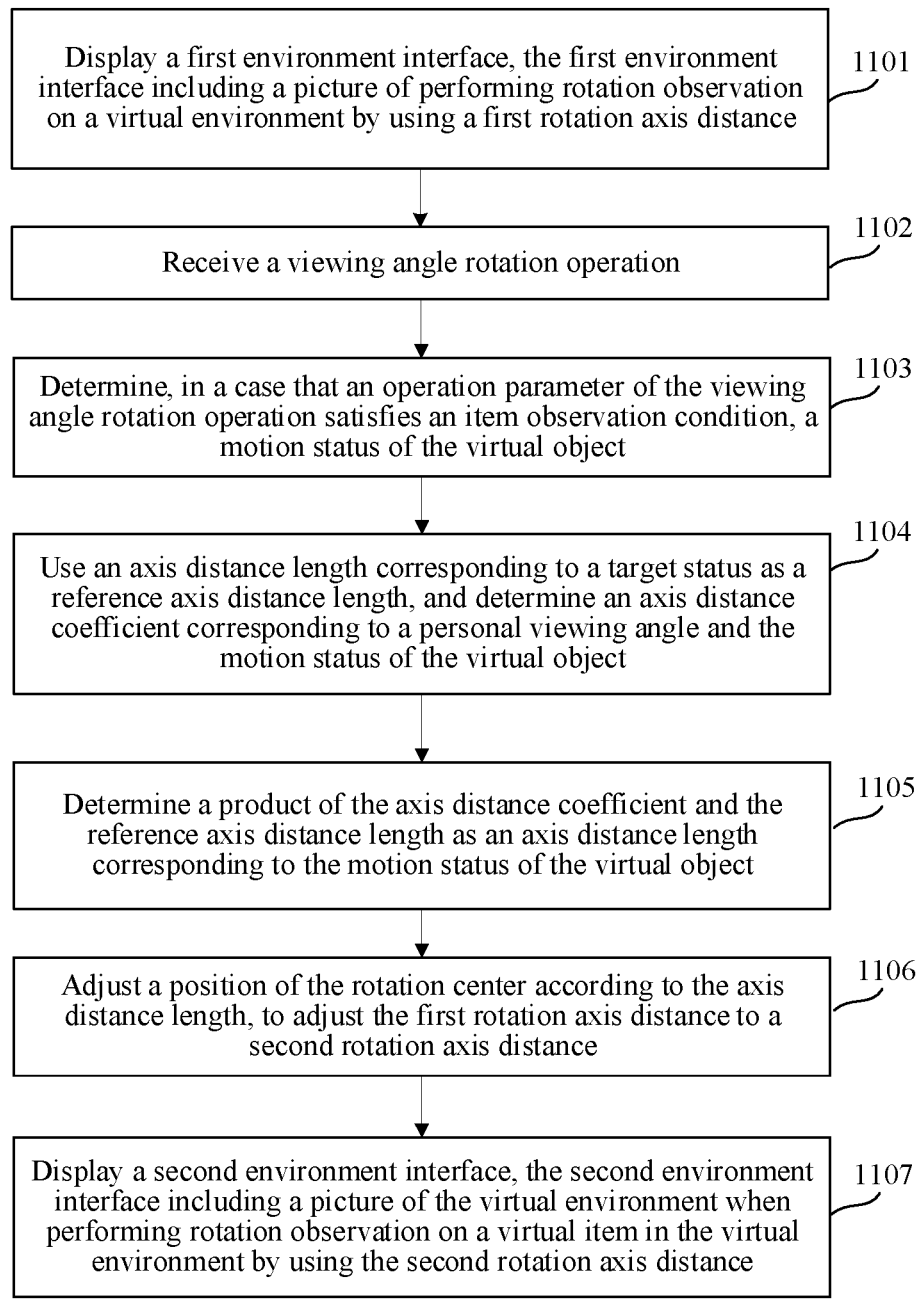
FIG. 11 is a flowchart of a method for observing a virtual item in a virtual environment according to another exemplary embodiment of this application.

In some embodiments, second rotation axis distances corresponding to different personal viewing angles are different. FIG. 11 is a flowchart of a method for observing a virtual item in a virtual environment according to another exemplary embodiment of this application. For example, the method is applied to a terminal. The method includes:

Step 1101. Display a first environment interface, the first environment interface including a picture of a virtual environment performing rotation observation by using a first rotation axis distance.

In some embodiments, the first rotation axis distance is a distance between an observation point of a virtual object and a rotation center. In some embodiments, the virtual environment is observed by acquiring pictures of the virtual environment by using a camera model at the observation point. That is, the first rotation axis distance is a distance between the camera model and the rotation center.

In some embodiments, an observation manner in which rotation observation is performed on the virtual environment by using the first rotation axis distance is described in detail in the foregoing step 501. Details are not described again.

Step 1102. Receive a viewing angle rotation operation.

In some embodiments, the viewing angle rotation operation is configured for rotating the observation point about the rotation center.

In some embodiments, an implementation of the viewing angle rotation operation is described in detail in the foregoing step 502. Details are not described again.

Step 1103. Determine, when an operation parameter of the viewing angle rotation operation satisfies an item observation condition, a motion status of the virtual object.

In some embodiments, the motion status includes any one of a standing status, a running status, a walking status, a driving status, a riding status, and a swimming status.

In some embodiments, a manner of determining whether the operation parameter of the viewing angle rotation operation satisfies the item observation condition is described in detail in the foregoing step 503. Details are not described again.

Step 1104. Use an axis distance length corresponding to a target status as a reference axis distance length, and determine an axis distance coefficient corresponding to a personal viewing angle and the motion status of the virtual object.

In some embodiments, any status in the motion statuses may be implemented as the target status. For example, an axis distance length corresponding to a standing status is used as the reference axis distance length.

In some embodiments, an axis distance length corresponding to a target status at a target personal viewing angle is used as the reference axis distance length. For example, an axis distance length corresponding to a standing status at a first-person viewing angle is used as the reference axis distance length.

In some embodiments, the terminal stores a correspondence among personal viewing angles, motion statuses, and axis distance coefficients. Alternatively, the terminal obtains the correspondence from a server. For example, the correspondence is shown in the following Table 4:

TABLE 4

| Motion status | Personal viewing angle | Axis distance coefficient |
| --- | --- | --- |
| Standing status | First-person viewing angle | (1, 1) |
| | Third-person viewing angle | (0.5, 0.85) |
| Driving status | First-person viewing angle | (0.75, 0.8) |
| | Third-person viewing angle | (2.25, 0.85) |
| Swimming status | First-person viewing angle | (0.5, 0.65) |
| | Third-person viewing angle | (1, 1.2) |

Step 1105. Determine a product of the axis distance coefficient and the reference axis distance length as an axis distance length corresponding to the motion status of the virtual object.

Referring to the foregoing Table 4, when a second rotation axis distance corresponding to a standing status at a first-person viewing angle is (x, y), a second rotation axis distance corresponding to the standing status at a third-person viewing angle is (0.5x, 0.85y), a second rotation axis distance corresponding to a driving status at a first-person viewing angle is (0.75x, 0.8y), a second rotation axis distance corresponding to the driving status at a third-person viewing angle is (2.25x, 0.85y), a second rotation axis distance corresponding to a swimming status at a first-person viewing angle is (0.5x, 0.65y), and a second rotation axis distance corresponding to the swimming status at a third-person viewing angle is (x, 1.2y).

In some embodiments, the axis distance length may be alternatively customized in a manner of interface display. That is, the terminal displays an axis distance adjustment interface, and the axis distance adjustment interface includes a previewed axis distance. A user may adjust the axis distance length by performing a dragging operation or a value input operation, or may adjust axis distance lengths corresponding to different motion statuses at different personal viewing angles by selecting a motion status and a personal viewing angle.

Step 1106. Adjust a position of the rotation center according to the axis distance length, to adjust the first rotation axis distance to a second rotation axis distance.

In some embodiments, the second rotation axis distance is a distance between the observation point and an adjusted rotation center. In some embodiments, the second rotation axis distance is a distance between the camera model and the adjusted rotation center.

Step 1107. Display a second environment interface, the second environment interface including a picture of a virtual item in the virtual environment when performing rotation observation on the virtual item by using the second rotation axis distance.

In some embodiments, when a viewing angle rotation operation is received on the second environment interface, and the viewing angle rotation operation satisfies a rotation axis distance restoring condition, the second rotation axis distance restores to the first rotation axis distance by adjusting the position of the rotation center. For example, when an upward slide operation is received on a display screen of the terminal, and the upward slide operation falls within a target angle range, the second rotation axis distance restores to the first rotation axis distance by adjusting the position of the rotation center.

In conclusion, in the method for observing a virtual item in a virtual environment provided in this embodiment, the operation parameter of the viewing angle rotation operation is matched against the item observation condition, to determine whether an observation viewing angle after the viewing angle rotation operation is a viewing angle for observing the virtual item. When the observation viewing angle after the viewing angle rotation operation is the viewing angle for observing the virtual item, a rotation axis distance between the observation point and the rotation center is adjusted by adjusting the position of the rotation center, so as to adjust rotation flexibility of the observation point. Rotation flexibility matching observation of the virtual item is switched in real time by monitoring the viewing angle rotation operation, to distinguish an ordinary axis distance and an axis distance for observing the virtual item, so as to observe the virtual item by using a wider field of view in a more flexible manner.

In the method provided in this embodiment, fitting is performed by using second rotation axis distances at different personal viewing angles, avoiding a problem of mismatch of axis distances caused because degrees of immersion of the virtual environment are different, but the second rotation axis distances are the same at the first-person viewing angle and the third-person viewing angle.

Figure 12:
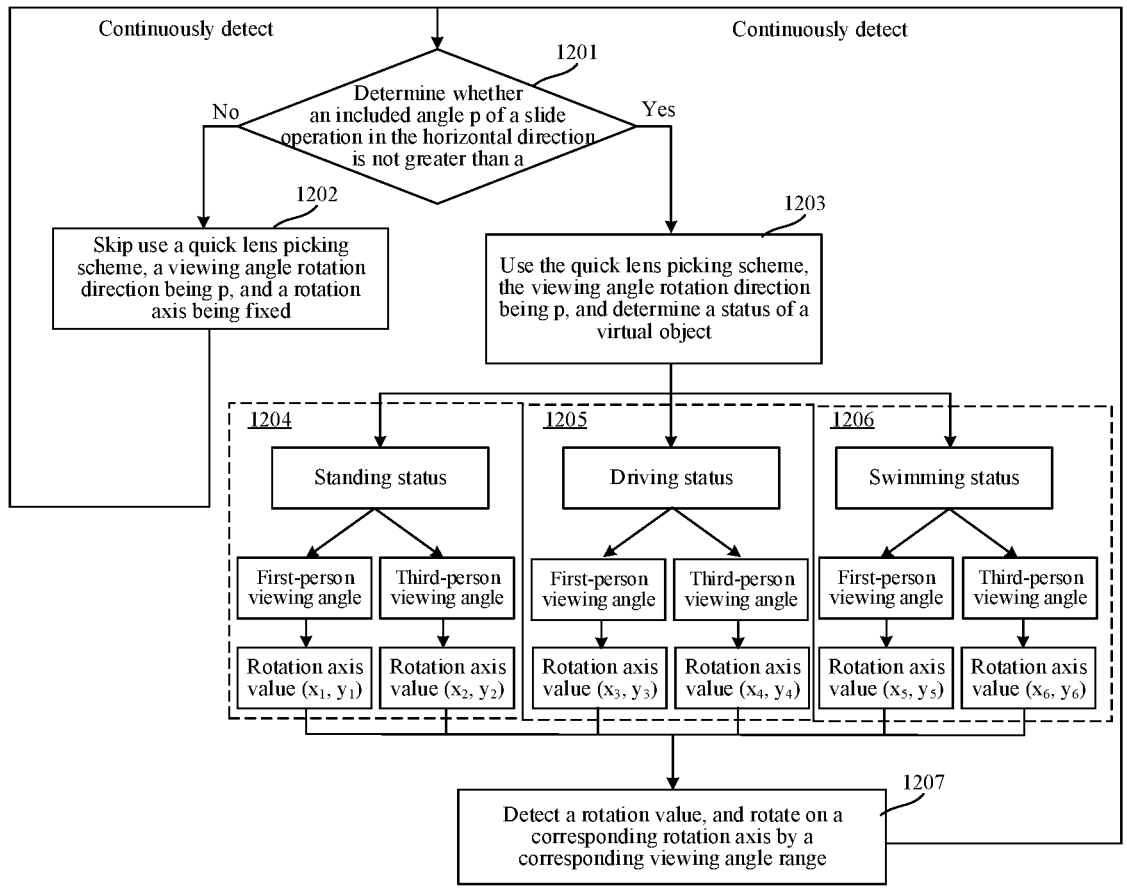
FIG. 12 is a flowchart of a method for observing a virtual item in a virtual environment according to another exemplary embodiment of this application.

For example, FIG. 12 is an overall flowchart of a method for observing a virtual item in a virtual environment according to another exemplary embodiment of this application. For example, the method is applied to a terminal. As shown in FIG. 12, the method includes:

Step 1201. Determine whether an included angle p of a slide operation in the horizontal direction is not greater than a.

In some embodiments, the determining operation is to determine whether the slide operation satisfies an item observation condition.

Step 1202. Skip use, when p>a, a quick lens picking scheme, a viewing angle rotation direction being p, and a rotation axis being fixed.

In some embodiments, when p>a, that is, the slide operation does not satisfy the item observation condition, the viewing angle rotation does not indicate that a virtual item in a virtual environment needs to be observed.

Step 1203. Use, when p≤a, the quick lens picking scheme, the viewing angle rotation direction being p, and determine a status of a virtual object.

In some embodiments, the determining a status of a virtual object includes determining a motion status of the virtual object. The motion status includes any one of a standing status, a driving status, and a swimming status.

Step 1204. Determine, when the virtual object is in the standing status, a rotation axis value at a first-person viewing angle as $(x_1, y_1)$, and a rotation axis value at a third-person viewing angle as $(x_2, y_2)$.

Step 1205. Determine, when the virtual object is in the driving status, the rotation axis value at the first-person viewing angle as $(x_3, y_3)$, and the rotation axis value at the third-person viewing angle as $(x_4, y_4)$.

Step 1206. Determine, when the virtual object is in the swimming status, the rotation axis value at the first-person viewing angle as $(x_5, y_5)$, and the rotation axis value at the third-person viewing angle as $(x_6, y_6)$.

Step 1207. Detect a rotation value, and rotate on a corresponding rotation axis by a corresponding viewing angle range.

In some embodiments, by using the rotation axis with an adjusted rotation axis value, the viewing angle is rotated according to a viewing angle rotation operation.

In conclusion, in the method for observing a virtual item in a virtual environment provided in this embodiment, the operation parameter of the viewing angle rotation operation is matched against the item observation condition, to determine whether an observation viewing angle after the viewing angle rotation operation is a viewing angle for observing the virtual item. When the observation viewing angle after the viewing angle rotation operation is the viewing angle for observing the virtual item, a rotation axis distance between the observation point and the rotation center is adjusted by adjusting the position of the rotation center, so as to adjust rotation flexibility of the observation point. Rotation flexibility matching observation of the virtual item is switched in real time by monitoring the viewing angle rotation operation, to distinguish an ordinary axis distance and an axis distance for observing the virtual item, so as to observe the virtual item by using a wider field of view in a more flexible manner.

It is to be understood that, the steps in the embodiments of this application are not necessarily performed according to a sequence indicated by step numbers. Unless otherwise explicitly specified in this application, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages for the another step.

Figure 13:
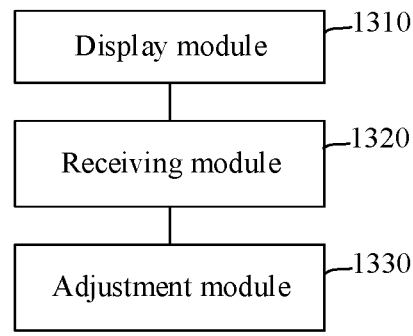
FIG. 13 is a structural block diagram of an apparatus for observing a virtual item in a virtual environment according to an exemplary embodiment of this application.

FIG. 13 is a structural block diagram of an apparatus for observing a virtual item in a virtual environment according to an exemplary embodiment of this application. The apparatus may be implemented in a terminal. As shown in FIG. 13, the apparatus includes a display module 1310, a receiving module 1320, and an adjustment module 1330.

The display module 1310 is configured to display a first environment interface, the first environment interface including a picture of a virtual environment performing rotation observation by using a first rotation axis distance, the first rotation axis distance being a distance between an observation point of a virtual object and a rotation center.

The receiving module 1320 is configured to receive a viewing angle rotation operation, the viewing angle rotation operation being configured for rotating the observation point about the rotation center.

The adjustment module 1330 is configured to adjust, when an operation parameter of the viewing angle rotation operation satisfies an item observation condition, the first rotation axis distance to a second rotation axis distance by adjusting a position of the rotation center.

The display module 1310 is further configured to display a second environment interface, the second environment interface including a picture of the virtual environment when performing rotation observation on a virtual item in the virtual environment by using the second rotation axis distance.

Figure 14:
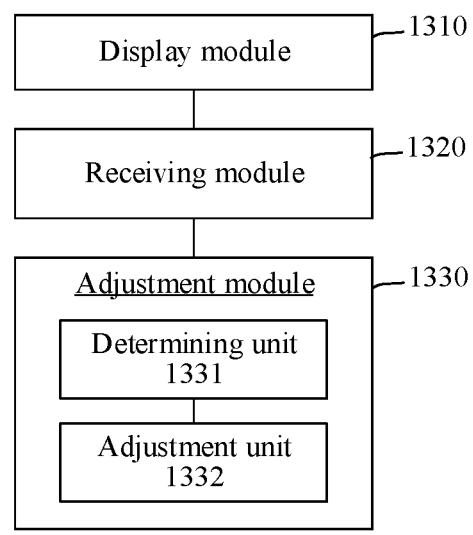
FIG. 14 is a structural block diagram of an apparatus for observing a virtual item in a virtual environment according to another exemplary embodiment of this application.

In some embodiments, as shown in FIG. 14, the adjustment module 1330 includes:

a determining unit 1331, configured to determine a motion status of the virtual object;

the determining unit 1331 being further configured to determine an axis distance length corresponding to the motion status of the virtual object, the axis distance length being an axis distance length of the second rotation axis distance; and an adjustment unit 1332, configured to adjust the position of the rotation center according to the axis distance length, to adjust the first rotation axis distance to the second rotation axis distance.

In some embodiments, the determining unit 1331 is further configured to use an axis distance length corresponding to a target status as a reference axis distance length, and determine an axis distance coefficient corresponding to the motion status and the target status of the virtual object.

The determining unit 1331 is further determine a product of the axis distance coefficient and the reference axis distance length as the axis distance length corresponding to the motion status of the virtual object.

In some embodiments, the motion status is any one of a standing status, a driving status, and a swimming status, and the standing status is the target status;

the determining unit 1331 is further configured to determine, when the virtual object is in the driving status, a first axis distance coefficient corresponding to the driving status, and determining a product of the first axis distance coefficient and the reference axis distance length as an axis distance length corresponding to the driving status;

or the determining unit 1331 is further configured to determine, when the virtual object is in the swimming status, a second axis distance coefficient corresponding to the swimming status, and determine a product of the second axis distance coefficient and the reference axis distance length as an axis distance length corresponding to the swimming status.

In some embodiments, the determining unit 1331 is further configured to determine a personal viewing angle at which the virtual environment is observed; and determine the axis distance coefficient corresponding to personal viewing angle and the motion status of the virtual object.

In some embodiments, the operation parameter includes an operation angle.

The adjustment module 1330 is further configured to adjust, when the operation angle falls within a target angle range, the first rotation axis distance to the second rotation axis distance by adjusting the position of the rotation center.

In some embodiments, the operation parameter further includes a virtual item existence status in a preset distance range of the virtual object in the virtual environment.

The adjustment module 1330 is further configured to adjust, when the operation angle falls within the target angle range and a virtual item exists in the preset distance range of the virtual object in the virtual environment, the first rotation axis distance to the second rotation axis distance by adjusting the position of the rotation center.

In some embodiments, the virtual environment is observed by using a camera model at the observation point, and the operation parameter further includes a rotation ending position of the camera model.

The adjustment module 1330 is further configured to adjust, when the operation angle falls within the target angle range and the rotation ending position falls within a preset position range, the first rotation axis distance to the second rotation axis distance by adjusting the position of the rotation center. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In conclusion, in the apparatus for observing a virtual item in a virtual environment provided in this embodiment, the operation parameter of the viewing angle rotation operation is matched against the item observation condition, to determine whether an observation viewing angle after the viewing angle rotation operation is a viewing angle for observing the virtual item. When the observation viewing angle after the viewing angle rotation operation is the viewing angle for observing the virtual item, a rotation axis distance between the observation point and the rotation center is adjusted by adjusting the position of the rotation center, so as to adjust rotation flexibility of the observation point. Rotation flexibility matching observation of the virtual item is switched in real time by monitoring the viewing angle rotation operation, to distinguish an ordinary axis distance and an axis distance for observing the virtual item, so as to observe the virtual item by using a wider field of view in a more flexible manner.

Figure 15:
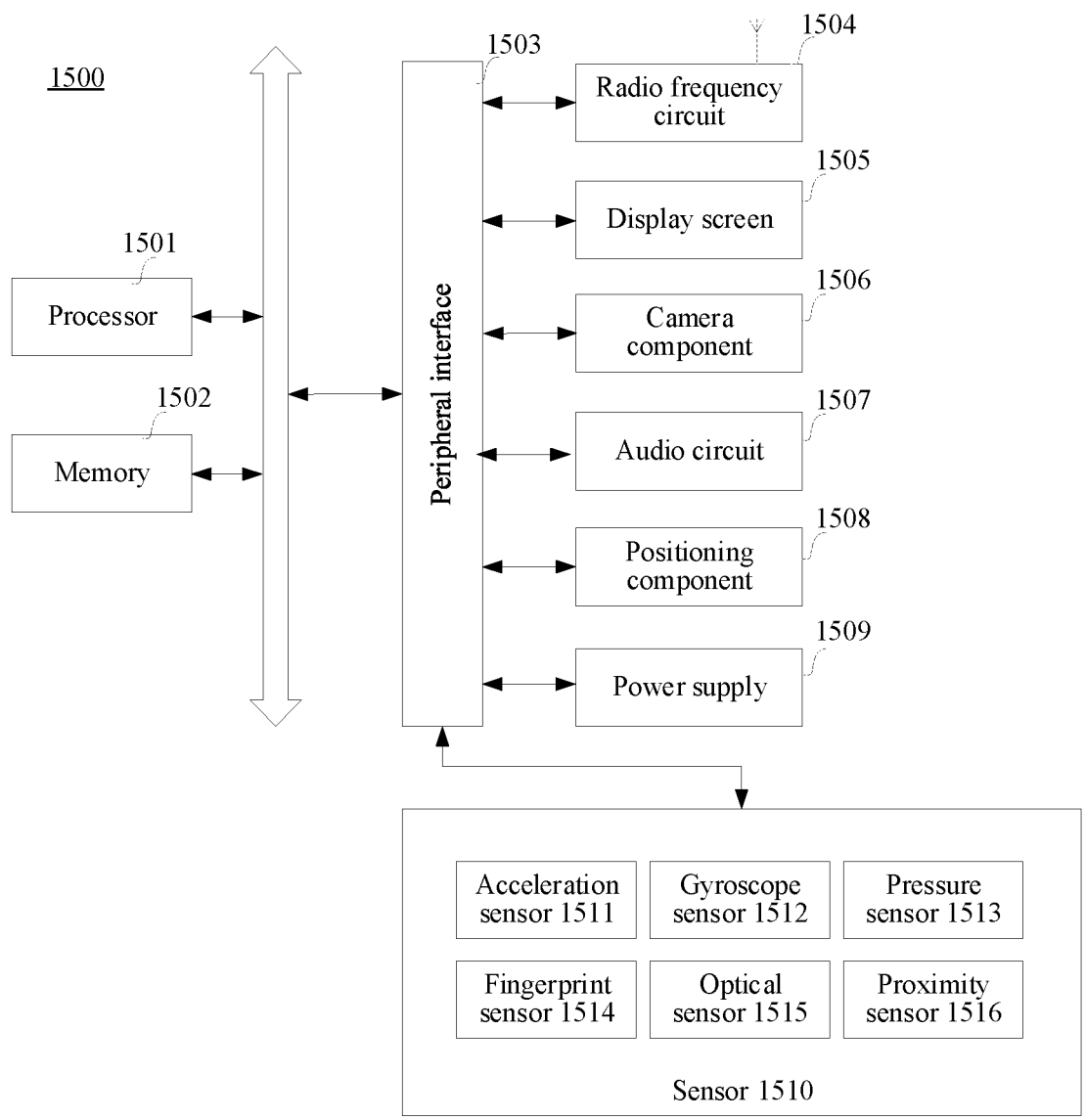
FIG. 15 is a structural block diagram of a terminal according to another exemplary embodiment of this application.

FIG. 15 is a structural block diagram of a terminal 1500 according to an exemplary embodiment of this application. The terminal 1500 may be a smartphone, a tablet computer, an MP3 player, an MP4 player, a notebook computer, or a desktop computer. The terminal 1500 may also be referred to as user equipment, a portable terminal, a laptop terminal, a desktop terminal, or another name.

Generally, the terminal 1500 includes a processor 1501 and a memory 1502.

The processor 1501 may include one or more processing cores, where "a plurality of" means at least two, for example, a 4-core processor or an 8-core processor. The processor 1501 may be implemented in at least one hardware form of a digital signal processor (DSP), a field-programmable gate array (FPGA), and a programmable logic array (PLA). The processor 1501 may alternatively include a main processor and a coprocessor. The main processor is configured to process data in an active state, also referred to as a central processing unit (CPU). The coprocessor is a low-power processor configured to process data in a standby state. In some embodiments, a graphics processing unit (GPU) may be integrated into the processor 1501. The GPU is configured to be responsible for rendering and drawing content to be displayed on a display screen. In some embodiments, the processor 1501 may further include an artificial intelligence (AI) processor. The AI processor is configured to process a computing operation related to machine learning.

The memory 1502 may include one or more computer-readable storage media. The computer-readable storage medium may be non-transient. The memory 1502 may further include a high-speed random access memory (RAM), and a non-volatile memory such as one or more magnetic disk storage devices and a flash storage device. In some embodiments, the non-transient computer-readable storage medium in the memory 1502 is configured to store at least one instruction, and the at least one instruction is configured to be executed by the processor 1501 to implement the method for observing a virtual item in a virtual environment provided in the method embodiments of this application.

In some embodiments, the terminal 1500 may further optionally include: a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral includes: at least one of a radio frequency (RF) circuit 1504, a touch display screen 1505, a camera component 1506, an audio circuit 1507, a positioning component 1508, and a power supply 1509.

The peripheral interface 1503 may be configured to connect at least one peripheral related to input/output (I/O) to the processor 1501 and the memory 1502. In some embodiments, the processor 1501, the memory 1502, and the peripheral interface 1503 are integrated into the same chip or circuit board. In some other embodiments, any or both of the processor 1501, the memory 1502, and the peripheral interface 1503 may be implemented on an independent chip or circuit board. This is not limited in this embodiment.

The RF circuit 1504 is configured to receive and transmit an RF signal, which is also referred to as an electromagnetic signal. The RF circuit 1504 communicates with a communication network and another communication device by using the electromagnetic signal. The RF circuit 1504 converts an electric signal into an electromagnetic signal for transmission, or converts a received electromagnetic signal into an electric signal. In some embodiments, the RF circuit 1504 includes: an antenna system, an RF transceiver, one or more amplifiers, a tuner, an oscillator, a digital signal processor, a codec chip set, a subscriber identity module card, and the like. The RF circuit 1504 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1504 may also include a circuit related to near field communication (NFC). This is not limited in this application.

The display screen 1505 is configured to display a user interface (UI). The UI may include a graph, text, an icon, a video, and any combination thereof. When the display screen 1505 is a touch display screen, the display screen 1505 is further capable of collecting a touch signal on or above a surface of the display screen 1505. The touch signal may be inputted to the processor 1501 as a control signal for processing. In this case, the display screen 1505 may be further configured to provide a virtual button and/or a virtual keyboard that are/is also referred to as a soft button and/or a soft keyboard. In some embodiments, there may be one display screen 1505, disposed on a front panel of the terminal 1500. In some other embodiments, there are at least two display screens 1505, disposed on different surfaces of the terminal 1500 respectively or in a folded design. In still other embodiments, the display screen 1505 may be a flexible display screen, disposed on a curved surface or a folded surface of the terminal 1500. The display screen 1505 may be further set to have a non-rectangular irregular graph, that is, a special-shaped screen. The display screen 1505 may be prepared by using materials such as a liquid crystal display (LCD), an organic light-emitting diode (OLED), or the like.

The camera component 1506 is configured to acquire an image or a video. In some embodiments, the camera component 1506 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1506 may further include a flashlight. The flash may be a monochrome temperature flash, or may be a double color temperature flash. The double color temperature flash refers to a combination of a warm light flash and a cold light flash, and may be used for light compensation under different color temperatures.

The audio circuit 1507 may include a microphone and a speaker. The microphone is configured to collect sound waves of a user and an environment, and convert the sound waves into electrical signals and input the electrical signals into the processor 1501 for processing, or input the electrical signals into the RF circuit 1504 to implement voice communication. For the purpose of stereo collection or noise reduction, there may be a plurality of microphones, disposed at different portions of the terminal 1500 respectively. The microphone may be further an array microphone or an omni-directional collection type microphone. The speaker is configured to convert electrical signals from the processor 1501 or the RF circuit 1504 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1507 may also include an earphone jack.

The positioning component 1508 is configured to determine a current geographic location of the terminal 1500, to implement navigation or a location based service (LBS). The positioning component 1508 may be a positioning component based on the Global Positioning System (GPS) of the United States, the BeiDou system of China, or the GALILEO System of the European Union.

The power supply 1509 is configured to supply power to components in the terminal 1500. The power supply 1509 may be an alternating current, a direct current, a primary battery, or a rechargeable battery. When the power supply 1509 includes the rechargeable battery, the rechargeable battery may be a wired charging battery or a wireless charging battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1500 further includes one or more sensors 1510. The one or more sensors 1510 include, but are not limited to, an acceleration sensor 1511, a gyroscope sensor 1512, a pressure sensor 1513, a fingerprint sensor 1514, an optical sensor 1515, and a proximity sensor 1516.

The acceleration sensor 1511 may detect a magnitude of acceleration on three coordinate axes of a coordinate system established with the terminal 1500. For example, the acceleration sensor 1511 may be configured to detect components of gravity acceleration on the three coordinate axes. The processor 1501 may control, according to a gravity acceleration signal collected by the acceleration sensor 1511, the touch display screen 1505 to display the UI in a landscape view or a portrait view. The acceleration sensor 1511 may be further configured to collect motion data of a game or a user.

The gyroscope sensor 1512 may detect a body direction and a rotation angle of the terminal 1500. The gyroscope sensor 1512 may cooperate with the acceleration sensor 1511 to collect a 3D action by the user on the terminal 1500. The processor 1501 may implement the following functions according to the data collected by the gyroscope sensor 1512: motion sensing (such as changing the UI according to a tilt operation of the user), image stabilization at shooting, game control, and inertial navigation.

The pressure sensor 1513 may be disposed at a side frame of the terminal 1500 and/or a lower layer of the touch display screen 1505. When the pressure sensor 1513 is disposed at the side frame of the terminal 1500, a holding signal of the user on the terminal 1500 may be detected. The processor 1501 performs left and right hand recognition or a quick operation according to the holding signal collected by the pressure sensor 1513. When the pressure sensor 1513 is disposed on the low layer of the touch display screen 1505, the processor 1501 controls, according to a pressure operation of the user on the touch display screen 1505, an operable control on the UI. The operable control includes at least one of a button control, a scroll-bar control, an icon control, and a menu control.

The fingerprint sensor 1514 is configured to collect a fingerprint of a user, and the processor 1501 recognizes an identity of the user according to the fingerprint collected by the fingerprint sensor 1514, or the fingerprint sensor 1514 recognizes the identity of the user based on the collected fingerprint. When the identity of the user is recognized as credible, the processor 1501 authorizes the user to perform a related sensitive operation. The sensitive operation includes unlocking a screen, viewing encrypted information, downloading software, paying, changing a setting, and the like. The fingerprint sensor 1514 may be disposed on a front surface, a back surface, or a side surface of the terminal 1500. When a physical button or a vendor logo is disposed on the terminal 1500, the fingerprint sensor 1514 may be integrated with the physical button or the vendor logo.

The optical sensor 1515 is configured to collect ambient light intensity. In an embodiment, the processor 1501 may control display brightness of the touch display screen 1505 according to the ambient light intensity collected by the optical sensor 1515. Specifically, when the ambient light intensity is relatively high, the display brightness of the touch display screen 1505 is turned up. In a case that the ambient light intensity is relatively low, the display brightness of the touch display screen 1505 is reduced. In another embodiment, the processor 1501 may further dynamically adjust a camera parameter of the camera component 1506 according to the ambient light intensity collected by the optical sensor 1515.

The proximity sensor 1516, also referred to as a distance sensor, is generally disposed on the front panel of the terminal 1500. The proximity sensor 1516 is configured to collect a distance between the user and the front surface of the terminal 1500. In an embodiment, when the proximity sensor 1516 detects that the distance between the user and the front surface of the terminal 1500 gradually becomes small, the touch display screen 1501 is controlled by the processor 1505 to switch from a screen-on state to a screen-off state. When the proximity sensor 1516 detects that the distance between the user and the front surface of the terminal 1500 gradually increases, the touch display screen 1501 is controlled by the processor 1505 to switch from the screen-off state to the screen-on state.

A person skilled in the art may understand that the structure shown in FIG. 15 does not constitute a limitation to the terminal 1500, and the terminal may include more or fewer components than those shown in the figure, or some components may be combined, or a different component arrangement may be used.

An embodiment of this application further provides a computer device. The computer device includes a memory and a processor, the memory storing at least one instruction, at least one program, a code set, or an instruction set, the at least one instruction, the at least one program, the code set, or the instruction set being loaded and executed by the processor, to implement the foregoing method for observing a virtual item in a virtual environment shown in any one of FIG. 5, FIG. 9, and FIG. 11.

An embodiment of this application further provides a computer-readable storage medium, the readable storage medium storing at least one instruction, at least one program, a code set, or an instruction set, the at least one instruction, the at least one program, the code set, or the instruction set being loaded and executed by a processor to implement the method for observing a virtual item in a virtual environment shown in any one of FIG. 5, FIG. 9, and FIG. 11.

This application further provides a computer program product, the computer program product, when run on a computer, causing the computer to perform the method for observing a virtual item in a virtual environment according to the foregoing method embodiments.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set, or an instruction set, the at least one instruction, the at least one program, the code set, or the instruction set being loaded and executed by a processor to implement the method for observing a virtual item in a virtual environment shown in any one of FIG. 5, FIG. 9, and FIG. 11.

In some embodiments, the computer-readable storage medium may include a read-only memory (ROM), a programmable ROM (PROM), an electrically programmable ROM (EPROM), an electrically erasable programmable ROM (EEPROM) or a flash memory. The volatile memory may include a RAM or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this application, but are not intended to limit this application. Any modification, equivalent replacement, or improvement and the like made within the spirit and principle of this application fall within the protection scope of this application.

What is claimed is:

1. A method for observing a virtual item in a virtual environment, performed by a computer device, the method comprising:
   displaying an environment interface, the environment interface including a picture of a virtual environment observed by a virtual object using an observation point associated with the virtual object;
   in response to a first viewing angle rotation operation by a user of the computing device, rotating the observation point about a first rotation center, wherein the first rotation center is at a first rotation axis distance from the observation point;
   based on a determination that the first viewing angle rotation operation satisfies a preset condition, adjusting a position of the first rotation center to a second rotation center at a second rotation axis distance from the observation point, the second rotation axis distance being larger than the first rotation axis distance;
   in response to a second viewing angle rotation operation by the user of the computing device, rotating the observation point about the second rotation center; and
   in response to a picking operation, controlling the virtual object to pick up a virtual item displayed in the picture of the virtual environment.

2. The method according to claim 1, wherein adjusting the position of the first rotation center to the second rotation center at the second rotation axis distance comprises:
   determining a motion status of the virtual object;
   determining an axis distance length corresponding to the motion status of the virtual object, wherein the axis distance length corresponds to the second rotation axis distance; and
   adjusting the position of the first rotation center to the second rotation center according to the determined axis distance length.

3. The method according to claim 2, wherein determining the axis distance length corresponding to the motion status of the virtual object comprises:
   using an axis distance length corresponding to a target status as a reference axis distance length, and determining an axis distance coefficient corresponding to the motion status and the target status of the virtual object; and
   determining a product of the axis distance coefficient and the reference axis distance length as the axis distance length corresponding to the motion status of the virtual object.

4. The method according to claim 3, wherein the motion status is any one of a driving status and a swimming status, and the target status is a standing status; and
   the determining an axis distance coefficient corresponding to the motion status and the target status of the virtual object, and the determining a product of the axis distance coefficient and the reference axis distance length as the axis distance length corresponding to the motion status of the virtual object comprises:
   determining, when the virtual object is in the driving status, a first axis distance coefficient corresponding to the driving status, and determining a product of the first axis distance coefficient and the reference axis distance length as an axis distance length corresponding to the driving status; or
   determining, when the virtual object is in the swimming status, a second axis distance coefficient corresponding to the swimming status, and determining a product of the second axis distance coefficient and the reference axis distance length as an axis distance length corresponding to the swimming status.

5. The method according to claim 3, wherein the determining an axis distance coefficient corresponding to the motion status and the target status of the virtual object comprises:
   determining a personal viewing angle at which the virtual environment is observed; and determining the axis distance coefficient corresponding to the personal viewing angle and the motion status of the virtual object.

6. The method according to claim 1, wherein:
the preset condition comprises an operation angle; and
the method further comprises:
adjusting, when the operation angle falls within a target angle range, the first rotation axis distance to the second rotation axis distance by adjusting the position of the rotation center.

7. The method according to claim 6, wherein:
the preset condition further comprises a virtual item existence status in a preset distance range of the virtual object in the virtual environment; and
the method further comprises:
adjusting, when the operation angle falls within the target angle range and a virtual item exists in the preset distance range of the virtual object in the virtual environment, the first rotation axis distance to the second rotation axis distance by adjusting the position of the rotation center.

8. The method according to claim 6, wherein:
the virtual environment is observed by using a camera model at the observation point, and the preset condition further comprises a rotation ending position of the camera model; and
the method further comprises:
adjusting, when the operation angle falls within the target angle range and the rotation ending position falls within a preset position range, the first rotation axis distance to the second rotation axis distance by adjusting the position of the rotation center.

9. A computer device, including a memory and a processor, the memory storing computer-readable instructions that, when executed by the processor, cause the computer device to perform operations comprising:
displaying an environment interface, the environment interface including a picture of a virtual environment observed by a virtual object using an observation point associated with the virtual object;
in response to a first viewing angle rotation operation by a user of the computing device, rotating the observation point about a first rotation center, wherein the first rotation center is at a first rotation axis distance from the observation point;
based on a determination that the first viewing angle rotation operation satisfies a preset condition, adjusting a position of the first rotation center to a second rotation center at a second rotation axis distance from the observation point, the second rotation axis distance being larger than the first rotation axis distance;
in response to a second viewing angle rotation operation by the user of the computing device, rotating the observation point about the second rotation center; and
in response to a picking operation, controlling the virtual object to pick up a virtual item displayed in the picture of the virtual environment.

10. The computer device according to claim 9, wherein adjusting the position of the first rotation center to the second rotation center at the second rotation axis distance comprises:
determining a motion status of the virtual object;
determining an axis distance length corresponding to the motion status of the virtual object, wherein the axis distance length corresponds to the second rotation axis distance; and adjusting the position of the first rotation center to the second rotation center according to the determined axis distance length.

11. The computer device according to claim 10, determining the axis distance length corresponding to the motion status of the virtual object comprises:
using an axis distance length corresponding to a target status as a reference axis distance length, and determining an axis distance coefficient corresponding to the motion status and the target status of the virtual object; and
determining a product of the axis distance coefficient and the reference axis distance length as the axis distance length corresponding to the motion status of the virtual object.

12. The computer device according to claim 11, wherein the motion status is any one of a driving status and a swimming status, and the target status is a standing status; and
the determining an axis distance coefficient corresponding to the motion status and the target status of the virtual object, and the determining a product of the axis distance coefficient and the reference axis distance length as the axis distance length corresponding to the motion status of the virtual object comprises:
determining, when the virtual object is in the driving status, a first axis distance coefficient corresponding to the driving status, and determining a product of the first axis distance coefficient and the reference axis distance length as an axis distance length corresponding to the driving status; or
determining, when the virtual object is in the swimming status, a second axis distance coefficient corresponding to the swimming status, and determining a product of the second axis distance coefficient and the reference axis distance length as an axis distance length corresponding to the swimming status.

13. The computer device according to claim 11, wherein the determining an axis distance coefficient corresponding to the motion status and the target status of the virtual object comprises:
determining a personal viewing angle at which the virtual environment is observed; and
determining the axis distance coefficient corresponding to the personal viewing angle and the motion status of the virtual object.

14. The computer device according to claim 9, wherein:
the preset condition comprises an operation angle; and
the operations further comprise:
adjusting, when the operation angle falls within a target angle range, the first rotation axis distance to the second rotation axis distance by adjusting the position of the rotation center.

15. The computer device according to claim 14, wherein:
the preset condition further comprises a virtual item existence status in a preset distance range of the virtual object in the virtual environment; and
the operations further comprise:
adjusting, when the operation angle falls within the target angle range and a virtual item exists in the preset distance range of the virtual object in the virtual environment, the first rotation axis distance to the second rotation axis distance by adjusting the position of the rotation center.

16. The computer device according to claim 14, wherein:
the virtual environment is observed by using a camera model at the observation point, and the preset condition further comprises a rotation ending position of the camera model; and
the operations further comprise:
adjusting, when the operation angle falls within the target angle range and the rotation ending position falls within a preset position range, the first rotation axis distance to the second rotation axis distance by adjusting the position of the rotation center.

17. A non-transitory computer-readable storage medium storing computer-readable instructions, the computer-readable instructions, when executed by one or more processors of a computer device, cause the computer device to perform operations comprising:
displaying an environment interface, the environment interface including a picture of a virtual environment observed by a virtual object using an observation point associated with the virtual object;
in response to a first viewing angle rotation operation by a user of the computing device, rotating the observation point about a first rotation center, wherein the first rotation center is at a first rotation axis distance from the observation point;
based on a determination that the first viewing angle rotation operation satisfies a preset condition, adjusting a position of the first rotation center to a second rotation center at a second rotation axis distance from the observation point, the second rotation axis distance being larger than the first rotation axis distance;
in response to a second viewing angle rotation operation by the user of the computing device, rotating the observation point about the second rotation center; and
in response to a picking operation, controlling the virtual object to pick up a virtual item displayed in the picture of the virtual environment.

18. The non-transitory computer-readable storage medium according to claim 17, wherein adjusting the position of the first rotation center to the second rotation center at the second rotation axis distance comprises:
determining a motion status of the virtual object;
determining an axis distance length corresponding to the motion status of the virtual object, wherein the axis distance length corresponds to the second rotation axis distance; and
adjusting the position of the first rotation center to the second rotation center according to the determined axis distance length.

19. The non-transitory computer-readable storage medium according to claim 18, wherein determining the axis distance length corresponding to the motion status of the virtual object comprises:
using an axis distance length corresponding to a target status as a reference axis distance length, and determining an axis distance coefficient corresponding to the motion status and the target status of the virtual object; and
determining a product of the axis distance coefficient and the reference axis distance length as the axis distance length corresponding to the motion status of the virtual object.

20. The non-transitory computer-readable storage medium according to claim 17, wherein:
the preset condition comprises an operation angle; and
the operations further comprise:
adjusting, when the operation angle falls within a target angle range, the first rotation axis distance to the second rotation axis distance by adjusting the position of the rotation center.

\* \* \* \* \*